July 14, 1959    F. L. THOMAS    2,894,354
V-TRAP

Filed Dec. 17, 1957    3 Sheets-Sheet 1

Franklin L. Thomas
INVENTOR.

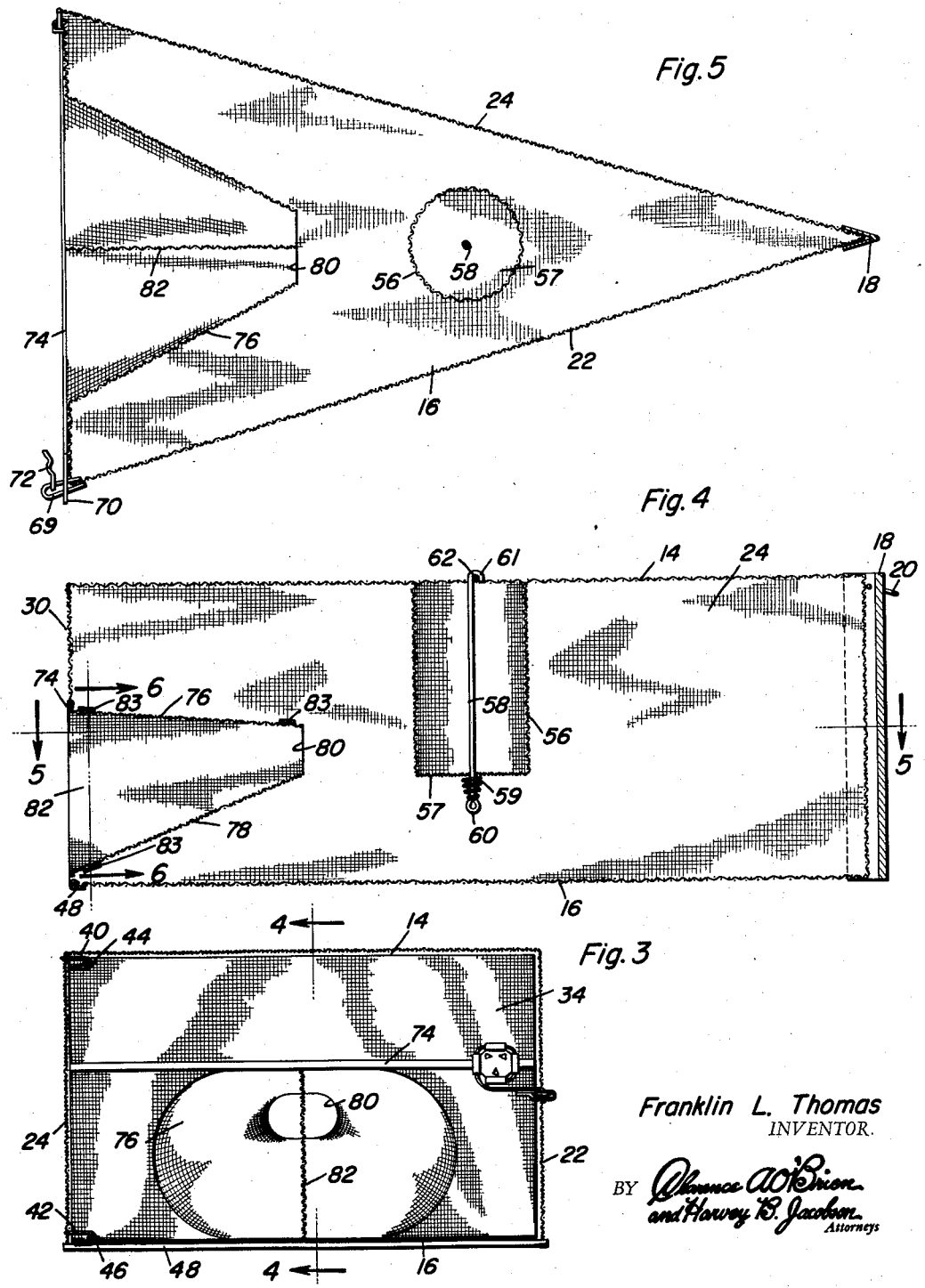

July 14, 1959 F. L. THOMAS 2,894,354
V-TRAP

Filed Dec. 17, 1957 3 Sheets-Sheet 3

Franklin L. Thomas
INVENTOR.

BY *Clarence A. O'Brien*
*and Harvey B. Jacobson*
Attorneys

United States Patent Office 2,894,354
Patented July 14, 1959

2,894,354
V-TRAP

Franklin L. Thomas, Ava, Mo.

Application December 17, 1957, Serial No. 703,430

2 Claims. (Cl. 43—101)

This invention relates to a fish trap and more particularly to a trap whose principal, although not exclusive, function is to trap minnows.

An object of the invention is to provide an improved minnow trap possessing various features which make it more desirable than any other minnow trap of which I have been made aware. One such feature is the shape of the trap. It is so shaped that it does not roll, prevents washing and tethering about in the stream. The shape keeps the trap headed downstream so that the minnows will enter as they scent the bait.

Another important feature is a large funnel end which is hinged so that it can be opened to take out the minnows with much more ease and less possible injury to the minnows. When the funnel end is opened, the trap is very easy to rebait.

The main body of the trap can be straightened very easy in case of damage or being bent in use because of the absence of unnecessary braces. The very construction of my trap is superior because the bracing is incorporated in the screening of the trap and funnel.

My invention not only combines compactness, lightness and sturdiness, but will harvest more minnows in less time and with less space replacement than other minnow traps of the same size. Another advantage of my invention over conventional types of minnow traps is in the ease of shipping. The door is detachable and with the funnel partition removable, the door with funnels can be stacked for more compact shipping. With the point end of my trap being wedge-shaped and narrower, the boxes may also be stacked for shipping, saving on shipping costs and less bulky packaging.

A further object of my invention is to provide a unique trap for fish, the trap being generally wedge-shaped and having side walls arranged to form such a shape and having a door at one end within which funnels are mounted. The funnels are formed of one piece of wire mesh screen that has a partition down the center dividing it into two tunnels that lead toward the bait container in the wedge-shaped trap. The comparatively large frontal area created by my trap makes it possible to receive the fish from a larger area. By this I mean that for the volume of trap displacement, the opening within which the minnows may swim is comparatively large.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 3 is a front view of the trap of Figure 1;

Figure 4 is a longitudinal sectional view taken on the line 4—4 of Figure 3;

Figure 5 is a transverse sectional view taken on the line 5—5 of Figure 4;

Figure 1:
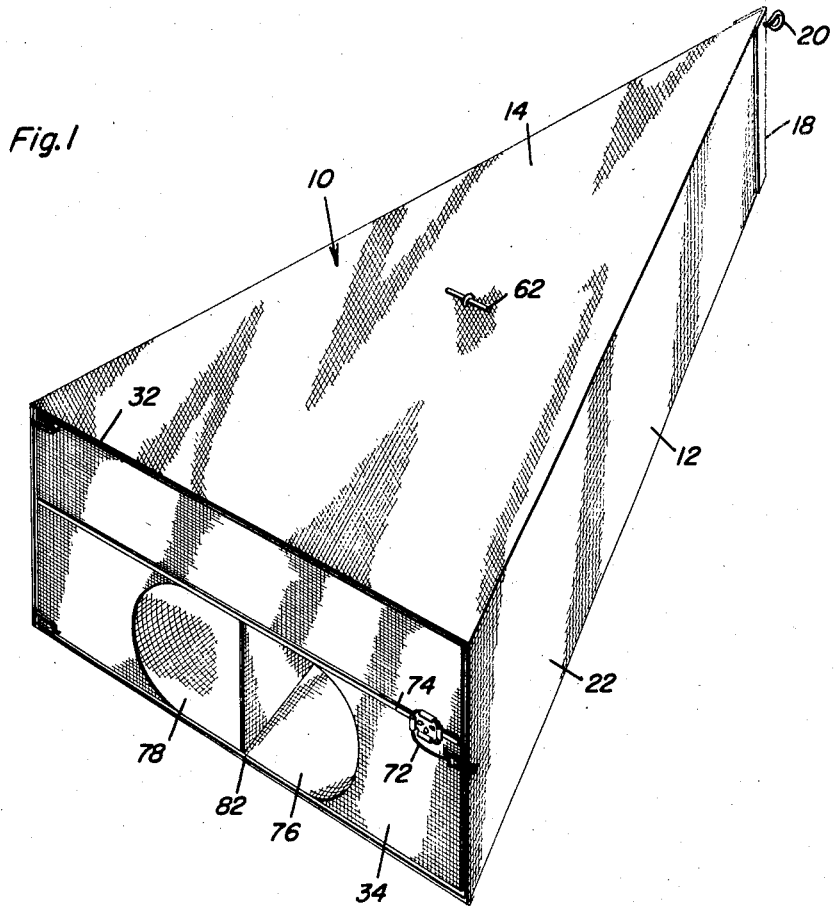
Figure 1 is a perspective view of a fish trap constructed in accordance with the invention.
Figure 2:
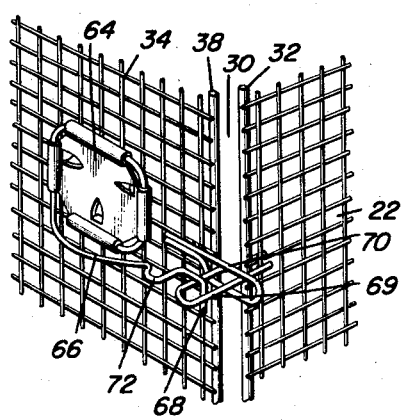
Figure 2 is a fragmentary perspective view showing the latch for the front door of the trap.
Figure 6:
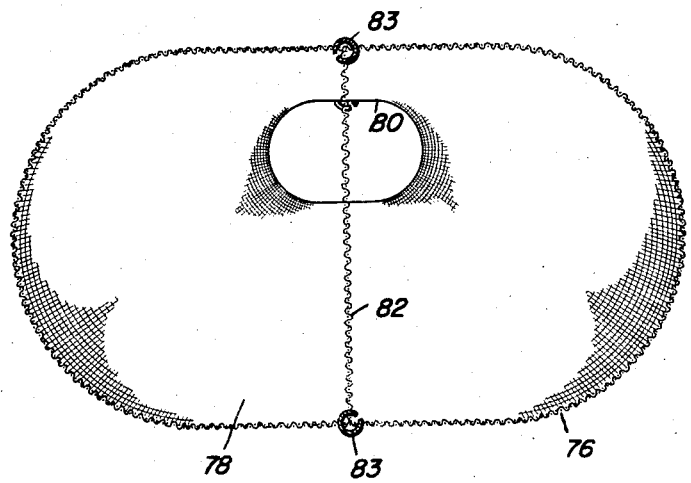
Figure 6 is a sectional view of the funnels and taken on the line 6—6 of Figure 4.

In the accompanying drawings there is a fish trap 10 which has a wedge shaped body 12. There are triangular top and bottom walls 14 and 16 respectively which taper to an apex at the rear of the container at which there is a V-shaped brace 18. An eye 20 for a line is attached to the upper part of brace 18, and the apical parts of the triangular shaped top and bottom walls 14 and 16 are fitted within the sides of the V-shaped brace 18. There are flat rectangular side walls 22 and 24 that are fitted in V-shaped brace and are attached at their upper and lower edges of the side edges of the walls 14 and 16. They may be attached in several ways, one of which is by welding, bolting (with or without frames) or by forming the side walls and top and bottom walls as one piece.

Figure 7:
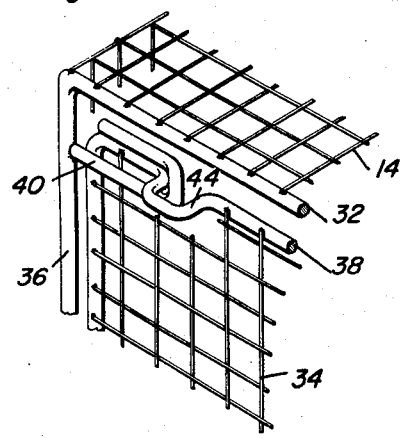
Figure 7 is a fragmentary perspective view of a hinge showing the door attached to the body of the trap.
Figure 8:
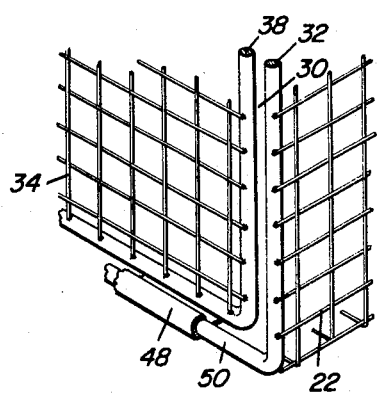
Figure 8 is a perspective view of a lower corner of the door.
Figure 9:
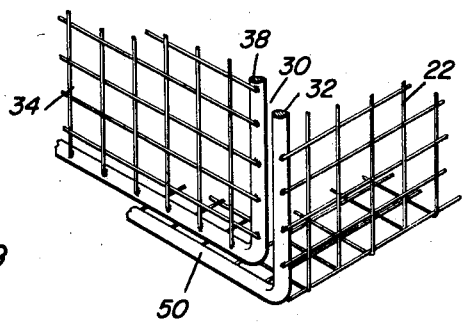
Figure 9 is a perspective view of the same lower corner as Figure 8 but illustrating a modification in construction.

The container 12 has a frontal opening 30 around which there is a rectangular frame 32 which is secured to the front end edges of the walls 14, 16, 22 and 24. Door 34 constitutes the front end wall of the trap and is hinged (see Figure 7) to the side 36 of frame 32. Door 34 is made of a wire mesh panel around the edges of which there is a rectangular frame 38 adhered, as by spot welding, to the ends of the wires that make up the wire mesh. Frame 38 is smaller than frame 32 and is adapted to fit within the area and closed by frame 32 (Figure 7). The pair of inwardly directed loops 40 and 42 are attached to the side 36 of frame 32. Each consists of a pair of parallel members and a connecting member at one pair of ends thereof. One of the parallel members is attached to side 36 of frame 32 while the other has a space between it and side 36. Upper and lower loops 44 and 46 respectively are formed in the top and bottom members of frame 38 and they are adapted to be engaged by the two eyes 40 and 42. The loop and eyes construction mount door 34 so that it is capable of hinged movement between the open and closed positions. For rigidity and strength of construction a metal strap 48 is attached to the bottom frame member 50 of frame 32 and extends across the threshold of the trap (Figure 8). Strip 48 has a rearwardly directed part and a cylindrical part which embraces and attaches to the lower frame member 50. As shown in Figure 9, a sub-combination of my invention contemplates the omission of strip 48.

The bait box 56 is located in the container 10 and is preferably suspended from the top wall 14. It is made of a cylinder of wire mesh and a bottom wall 57 through which rod 58 is passed. This rod has a spring 59 on it engaged with the outer surface of wall 57 and eye or other handle 60 on the lower extremity of rod 58. The upper extremity of the rod has a hook 61 that engages pin 62 on the upper (outside) surface of wall 14. Accordingly, the bait box is removable by pushing rod 58 against the yielding opposition of spring 59 and twisting about 90° to free hook 61 from pin 62. Then the entire bait box can be removed through the frontal opening 30 of container 12 so that the bait can be replenished and the box 56 can then be restored.

Although several latches could be used for holding the door 34 in the closed position, I have illustrated a preferred latch consisting of a mounting plate 64 on door 34 and a wire 66 firmly attached to the mounting plate. The wire is cantilevered from the mounting plate and has a downturned end 68 that is adapted to engage in loop 69. This loop is attached to the side 22 of the container and protrudes in advance or forwardly of the frontal opening 30 of the container. A corresponding loop 70 is on the door 34 and protrudes beyond frame 38 so that the eye of the loop 70 fits over the loop 69 after which the downturned or hook end of wire 66 can be inserted in eye 69. For additional resilience, one or more bends 72 can be formed in the wire 66. Transverse brace 74 extends across the wire mesh panel of door 34 and is located beneath the plate 64 and at the upper edge of funnel 76. The funnel has an oval open front and funnel shaped side walls 78 tapered toward a reduced size oval discharge opening 80 at the inner end thereof. The funnel is welded or otherwise secured to the edges of an opening in the door 34. The funnel is longitudinally divided by partition 82 attached by clips 83 to the top and bottom walls of funnel 76; this forms two separate entrances for the fish, both opening forwardly of the trap and having considerable frontal area.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fish trap comprising a wedge-shaped container that has mesh top, bottom and side walls and an open front, a frame around said open front, a door having a door frame, means on said frames mounting said door in said open front and at one of said side walls for hinged movement, a latch connected with the opposite side wall and said door to hold said door in closed position, said door having an opening therein, a funnel attached to said door and in registry with said opening and directed inwardly of the container, said door and funnel being of mesh material, a bait box located within said container and in alignment with said funnel, means separably holding said bait box fastened to one wall of said container, said bait box being smaller than said door so that when said door is open said bait box may be removed and returned through the open front of said container.

2. The trap of claim 1 wherein said top, bottom and side walls merge, a brace attached to said walls where they merge, and means by which to attach a line to said brace.

References Cited in the file of this patent

UNITED STATES PATENTS

| | | |
|---|---|---|
| 427,049 | Cochennour | May 6, 1890 |
| 2,177,215 | Hodgkinson | Oct. 24, 1939 |
| 2,193,072 | Neumann | Mar. 12, 1940 |
| 2,255,853 | Makus et al. | Sept. 16, 1941 |
| 2,516,658 | Stelly | July 25, 1950 |
| 2,731,761 | Marshall | Jan. 24, 1956 |

FOREIGN PATENTS

| | | |
|---|---|---|
| 12,780 | Great Britain | June 3, 1907 |